(12) United States Patent
Liu et al.

(10) Patent No.: US 12,189,254 B2
(45) Date of Patent: Jan. 7, 2025

(54) ARRAY SUBSTRATE AND METHOD FOR MANUFACTURING SAME, AND DISPLAY DEVICE

(71) Applicants: Hefei BOE Display Technology Co., Ltd., Anhui (CN); BOE Technology Group Co., Ltd., Beijing (CN)

(72) Inventors: Qi Liu, Beijing (CN); Zhenkun Yu, Beijing (CN); Zexu Liu, Beijing (CN); Wei Zhang, Beijing (CN); Lu Niu, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/423,026

(22) Filed: Jan. 25, 2024

(65) Prior Publication Data
US 2024/0160071 A1   May 16, 2024

Related U.S. Application Data

(63) Continuation of application No. 17/785,767, filed as application No. PCT/CN2021/093436 on May 12, 2021, now Pat. No. 11,934,077.

(30) Foreign Application Priority Data

Jun. 29, 2020   (CN) .......................... 202010604942.6

(51) Int. Cl.
*G02F 1/1362*   (2006.01)
*G02F 1/1343*   (2006.01)
*G02F 1/136*    (2006.01)

(52) U.S. Cl.
CPC .. *G02F 1/136295* (2021.01); *G02F 1/134363* (2013.01); *G02F 1/13606* (2021.01); *G02F 1/136209* (2013.01); *G02F 1/136286* (2013.01)

(58) Field of Classification Search
None
See application file for complete search history.

(56) References Cited

U.S. PATENT DOCUMENTS

| 7,212,256 B2 | 5/2007 | Lee et al. |
| 2002/0171782 A1 | 11/2002 | Yee et al. |

(Continued)

FOREIGN PATENT DOCUMENTS

| CN | 1983001 A | 6/2007 |
| CN | 101556393 A | 10/2009 |

(Continued)

OTHER PUBLICATIONS

PCT/CN2021/093436 ISR.

(Continued)

*Primary Examiner* — Richard H Kim
(74) *Attorney, Agent, or Firm* — IPro, PLLC

(57) ABSTRACT

Provided is an array substrate which includes a base substrate; a plurality of common electrodes disposed on a side of the base substrate; a plurality of data lines disposed on a side of the base substrate, wherein with respect to each of the data lines, a distance between the data line and a first target common electrode is different from a distance between the data line and a second target common electrode; and a plurality of pixel electrodes arranged in an array and disposed on a side of the base substrate.

19 Claims, 10 Drawing Sheets

(56) References Cited

U.S. PATENT DOCUMENTS

| | | |
|---|---|---|
| 2005/0012699 A1 | 1/2005 | Lee et al. |
| 2007/0132900 A1 | 6/2007 | Lee |
| 2014/0098312 A1 | 4/2014 | Kitani |
| 2016/0195745 A1 | 7/2016 | Xu |
| 2016/0246128 A1 | 8/2016 | Zhang et al. |
| 2016/0291754 A1 | 10/2016 | Jin |
| 2017/0153511 A1 | 6/2017 | Um et al. |
| 2022/0283470 A1 | 9/2022 | Cheng |

FOREIGN PATENT DOCUMENTS

| | | |
|---|---|---|
| CN | 104752440 A | 7/2015 |
| CN | 104777681 A | 7/2015 |
| CN | 104916648 A | 9/2015 |
| CN | 104965370 A | 10/2015 |
| CN | 105093754 A | 11/2015 |
| CN | 207265054 U | 4/2018 |
| TW | 200504432 A | 2/2005 |

OTHER PUBLICATIONS

CN202010604942.6 OA1.
CN202010604942.6 Notification to grant patent right for invention.
U.S. Appl. No. 17/785,767 Non-final office Action (Feb. 13, 2023).
U.S. Appl. No. 17/785,767 Non-final office Action (May 30, 2023).
U.S. Appl. No. 17/785,767 Notice of allowance (Nov. 8, 2023).

ARRAY SUBSTRATE AND METHOD FOR MANUFACTURING SAME, AND DISPLAY DEVICE

CROSS-REFERENCE TO RELATED APPLICATION

This application is a continuation application of U.S. application Ser. No. 17/785,767 and the continuation application claims priority to an international application No. PCT/CN2021/093436, filed on May 12, 2021, and the entire contents of which are incorporated herein by reference.

TECHNICAL FIELD

The present disclosure relates to the field of display technologies, and particular relates to an array substrate and a method for manufacturing the same, and a display device.

BACKGROUND

Liquid crystal displays (LCD) are widely used in large-sized display devices due to their high resolution and relatively low power consumption.

SUMMARY

The present disclosure provides an array substrate and a method for manufacturing the same, and a display device. The technical solutions are summarized as follows.

In one aspect, an array substrate is provided. The array substrate includes:
a base substrate;
a plurality of common electrodes disposed on a side of the base substrate;
a plurality of data lines disposed on a side of the base substrate, wherein an orthographic projection of each of the data lines on the base substrate is not overlapped with an orthographic projection of any of the common electrodes on the base substrate; and with respect to each of the data lines, a distance between the data line and a first target common electrode is different from a distance between the data line and a second target common electrode, the first target common electrode and the second target common electrode being respectively disposed on two sides of the data line; and
a plurality of pixel electrodes arranged in an array and disposed on a side of the base substrate, wherein an orthographic projection of each of the pixel electrodes on the base substrate is not overlapped with the orthographic projection of any of the data lines on the base substrate, and each column of the pixel electrodes is connected to one of the data lines; and with respect to each of the data lines, a distance between the data line and a first target pixel electrode is equal to a distance between the data line and a second target pixel electrode, the first target pixel electrode and the second target pixel electrode being respectively disposed on the two sides of the data line.

Optionally, with respect to each of the data lines, the distance between the data line and the first target common electrode is greater than the distance between the data line and the second target common electrode, and an orthographic projection of the pixel electrode connected to the data line on the base substrate at least partially is overlapped with an orthographic projection of the first target common electrode on the base substrate.

Optionally, the plurality of common electrodes, the plurality of data lines, and the plurality of pixel electrodes are sequentially stacked along a side distal from the base substrate.

Optionally, with respect to each of the data lines, the distance between the data line and the first target common electrode ranges from 3.5 μm to 4.5 μm; and the distance between the data line and the second target common electrode ranges from 0.5 μm to 1.5 μm.

Optionally, the array substrate further includes a plurality of gate lines and a gate insulating layer; wherein
the plurality of gate lines are disposed on a side of the base substrate, and an extension direction of each of the gate lines is intersected with an extension direction of any of the data lines; and
the gate insulating layer is disposed on a side, distal from the base substrate, of the plurality of gate lines.

Optionally, the array substrate further includes a passivation layer;
wherein the passivation layer is disposed on a side, distal from the base substrate, of the plurality of common electrodes.

In another aspect, a method for manufacturing an array substrate is provided. The method includes:
providing a base substrate; and
forming a plurality of common electrodes, a plurality of data lines, and a plurality of pixel electrodes arranged in an array, on a side of the base substrate; wherein
an orthographic projection of each of the data lines on the base substrate is not overlapped with an orthographic projection of any of the common electrodes on the base substrate; and with respect to each of the data lines, a distance between the data line and a first target common electrode is different from a distance between the data line and a second target common electrode, the first target common electrode and the second target common electrode being respectively disposed on two sides of the data line; and
an orthographic projection of each of the pixel electrodes on the base substrate is not overlapped with an orthographic projection of any of the data lines on the base substrate, wherein each column of the pixel electrodes is connected to one of the data lines; and with respect to each of the data lines, a distance between the data line and a first target pixel electrode is equal to a distance between the data line and a second target pixel electrode, the first target pixel electrode and the second target pixel electrode being respectively disposed on the two sides of the data line.

Optionally, forming the plurality of common electrodes on the side of the base substrate includes:
forming the plurality of common electrodes on the side of the base substrate by using a first mask, wherein a position where the first mask is disposed is offset by a target distance relative to a first initial position in a direction perpendicular to the data lines.

Optionally, forming the plurality of data lines on the side of the base substrate includes:
forming the plurality of data lines on the side of the base substrate by using a second mask, wherein a position where the second mask is disposed is offset by a target distance relative to a second initial position in a direction perpendicular to the data lines.

Optionally, forming the plurality of common electrodes and the plurality of lines on one side of the base substrate includes:

forming the plurality of common electrodes on the side of the base substrate; and forming the plurality of data lines on the side, distal from the base substrate, of the plurality of common electrodes.

Optionally, upon forming the plurality of data lines on the side, distal from the base substrate, of the plurality of common electrodes, the method further includes:

forming the plurality of pixel electrodes arranged in an array on the side, distal from the base substrate, of the plurality of data lines, wherein the orthographic projection of each of the pixel electrodes on the base substrate is not overlapped with the orthographic projection of any of the data lines on the base substrate, and each column of the pixel electrodes is connected to one of the data lines.

Optionally, prior to forming the plurality of common electrodes on the side of the base substrate, the method further includes:

forming a plurality of gate lines on a side of the base substrate; and forming a gate insulating layer on a side, distal from the base substrate, of the plurality of gate lines; and upon forming the plurality of data lines on the side, distal from the base substrate, of the plurality of common electrodes, the method further includes:

forming a passivation layer on a side, distal from the base substrate, of the plurality of data lines.

According to yet another aspect, a display device is provided. The display device includes a driving circuit and the array substrate according to the above aspect;

wherein the driving circuit is connected to the plurality of data lines in the array substrate, and is configured to supply a data signal to each of the data lines.

Optionally, the display device further includes a black matrix layer; wherein a distance between the black matrix layer and the first target common electrode in the array substrate is equal to a sum of a distance between the black matrix layer and the first target pixel electrode in the array substrate and a distance between the first common electrode and the first target pixel electrode; and a distance between the black matrix layer and the second target common electrode in the array substrate is equal to a sum of a distance between the black matrix layer and the second target pixel electrode in the array substrate and a distance between the second common electrode and the second target pixel electrode.

Optionally, the distance between the black matrix layer and the first target common electrode is less than the distance between the black matrix layer and the second target pixel electrode; or the distance between the black matrix layer and the first target common electrode is equal to the distance between the black matrix layer and the second target common electrode.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

DETAILED DESCRIPTION

For clearer descriptions of the objectives, technical solutions and advantages of the present disclosure, further detailed illustration is made to the embodiments of the present disclosure below with reference to the accompanying drawings.

In the related art, an array substrate in a liquid crystal display device includes: a common electrode, a plurality of data lines, and a plurality of pixel electrodes arranged in an array, wherein each of the data lines is connected to a column of pixel electrodes, and each of the data lines is disposed between two adjacent columns of pixel electrodes. Each of the data lines may supply a data signal to the pixel electrodes connected thereto. The pixel electrodes may drive liquid crystal molecules in a liquid crystal layer together with the common electrode to deflect under the driving of the data signal, thereby achieving the normal display of the display device.

However, the pixel electrodes are interfered by a coupled electric field of the data lines and the common electrode. In addition, two sides of the pixel electrodes are subjected to different degrees of interference, resulting in a relatively poor uniformity in luminance of the liquid crystal display device.

With the ever-increasing demands of users for a definition of large-sized display devices, an 8K ultra-high-definition display device has emerged. 8K may be configured to represent a display device with a resolution of 7680×4320. This display device has 7680 pixels in a pixel row direction and 4320 pixels in a pixel column direction. Moreover, the definition of the 8K ultra-high-definition display device may be 16 times that of a Blu-ray series display device. The Blu-ray series display device may also be referred to as a full-high-definition display device. In addition, the 8K ultra-high-definition display device has a color depth of 1.2 bits, and a scan rate up to 120 frames per second.

As the resolution of a display device increases, an image quality of the display device also needs to be improved. However, it is found through product testing that the 8K ultra-high-definition display device is prone to problems such as on-screen display (OSD) image persistence, horizontal stripes, and trace mura.

Figure 1:
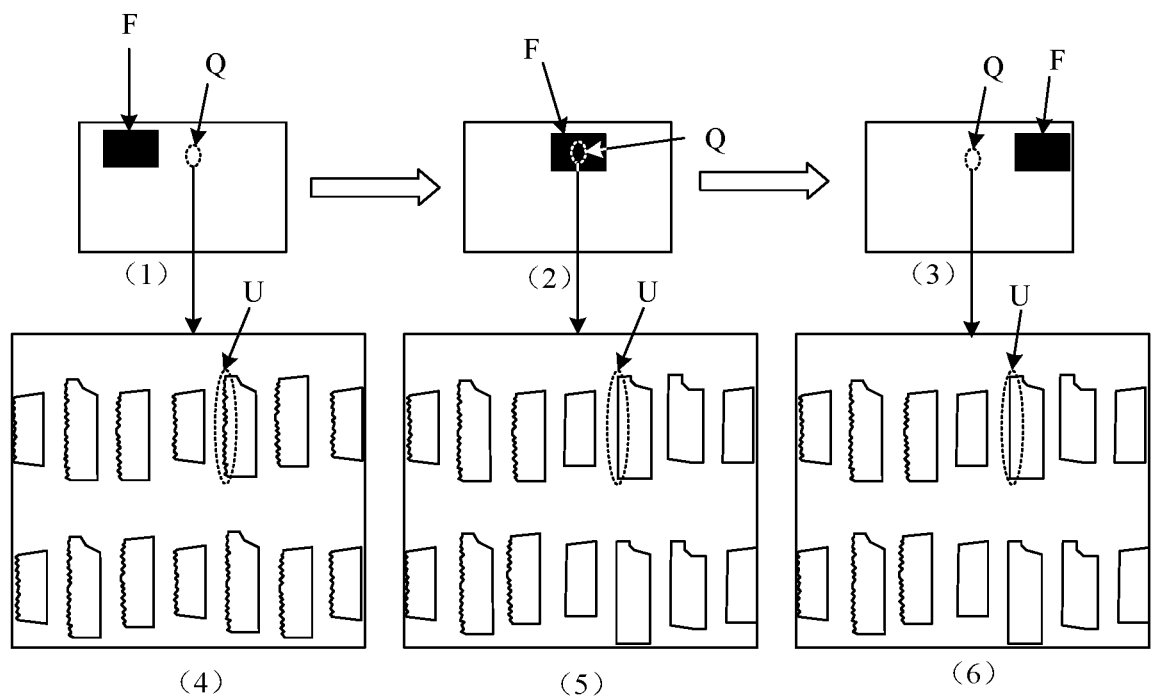
FIG. 1 is a schematic diagram of image persistence displayed on a screen in the related art.

In an exemplary embodiment, referring to FIG. 1, the transmittance on two sides of each pixel electrode is detected by a microscope, wherein (4) is an enlarged schematic diagram of a region Q in (1); (5) is an enlarged schematic diagram of the region Q in (2); and (6) is an enlarged schematic diagram of the region Q in (3). Referring to (1) and (4) in FIG. 1, an image U displayed in a region corresponding to a side of the pixel electrode may be in a saw-toothed shape before a black image (pattern) F moves to the region Q under a white background. Referring to (2) and (5) in FIG. 1, in the case that the black image F is disposed in the region Q, saw teeth of the image U displayed in the region corresponding to the side of the pixel electrode disappear. Referring to (3) and (6) in FIG. 1, after the black image F is moved from the region Q to other regions, the image U displayed in the region corresponding to the side of the pixel electrode still has no saw teeth, that is, a problem of OSD image persistence appears. The white background refers to a background in which a grayscale value of each pixel is 255; and the black image F refers to an image in which a grayscale value of each pixel is 0.

Figure 2:
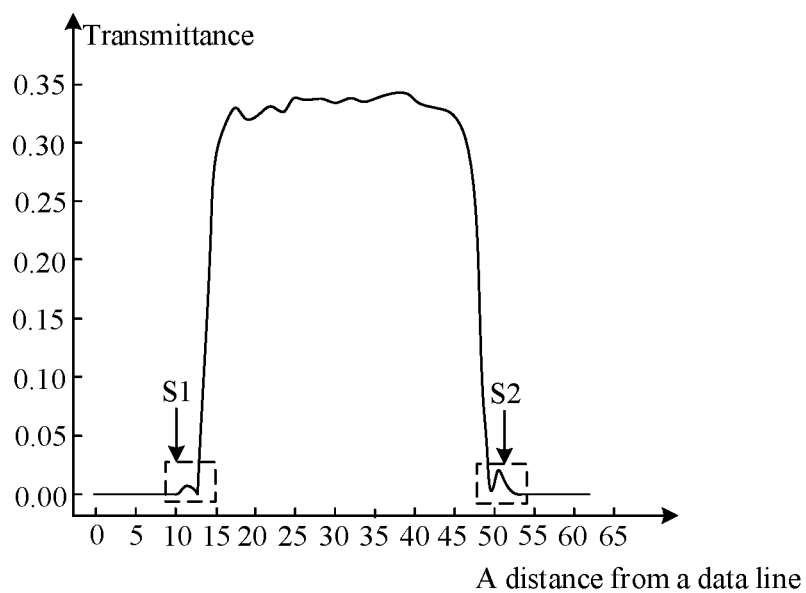
FIG. 2 is a schematic diagram of a transmittance curve of a pixel electrode in the related art.

With respect to a pixel electrode in the 8K ultra-high-definition display device, there is a chaotic electric field on two sides of the pixel electrode (a coupled electric field between data lines 103 and a common electrode 102), which causes liquid crystal molecules in a liquid crystal layer to deflect disorderly in this chaotic field, and further causes the formation of weak regions with very dark luminance on the two sides of the pixel electrode. Referring to FIG. 2, a transmittance curve of a pixel electrode may be acquired by using simulation software. Referring to FIG. 2, transmittance curves of a first region S1 and a second region S2 on two sides of the pixel electrode are different, i.e., the transmittances on the two sides of the pixel electrode are different. That is, the two sides of the pixel electrode are subjected to different degrees of interferences from a coupled electric field, which in turn causes the inconsistency in luminance of display regions corresponding to the two sides of the pixel electrode, resulting in a relatively poor uniformity in luminance of a display device, i.e., a poor display effect of the display device. Moreover, the problems of OSD image persistence, horizontal streaks, and trace mura are all caused by the different degrees of interferences on the two sides of the pixel electrode from the coupled electric field. An ordinate in FIG. 2 is configured to represent the transmittance, while an abscissa is configured to represent a distance from a data line connected to this pixel electrode, wherein a unit is micron (μm).

Figure 3:
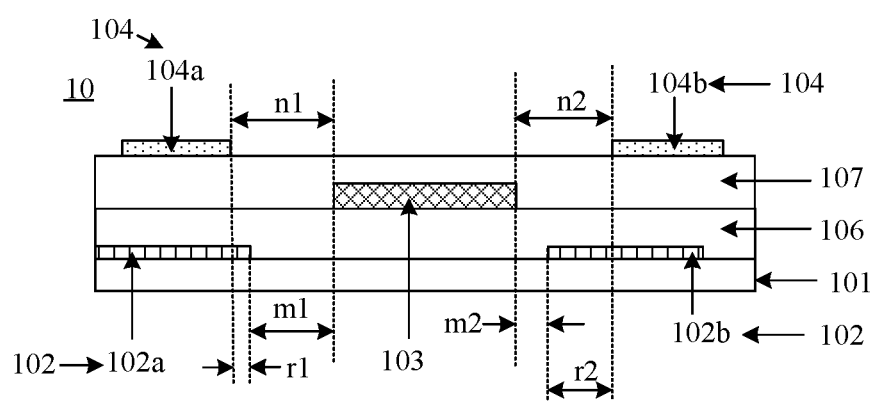
FIG. 3 is a schematic structural diagram of an array substrate according to an embodiment of the present disclosure.

FIG. 3 is a schematic structural diagram of an array substrate 10 according to an embodiment of the present disclosure. Referring to FIG. 3, the array substrate 10 may include a base substrate 101, a plurality of common electrodes 102, a plurality of data lines 103, and a plurality of pixel electrodes 104 arranged in an array. The plurality of common electrodes 102, the plurality of data lines 103, and the plurality of pixel electrodes 104 are sequentially disposed on a side of the base substrate 101.

Figure 4:
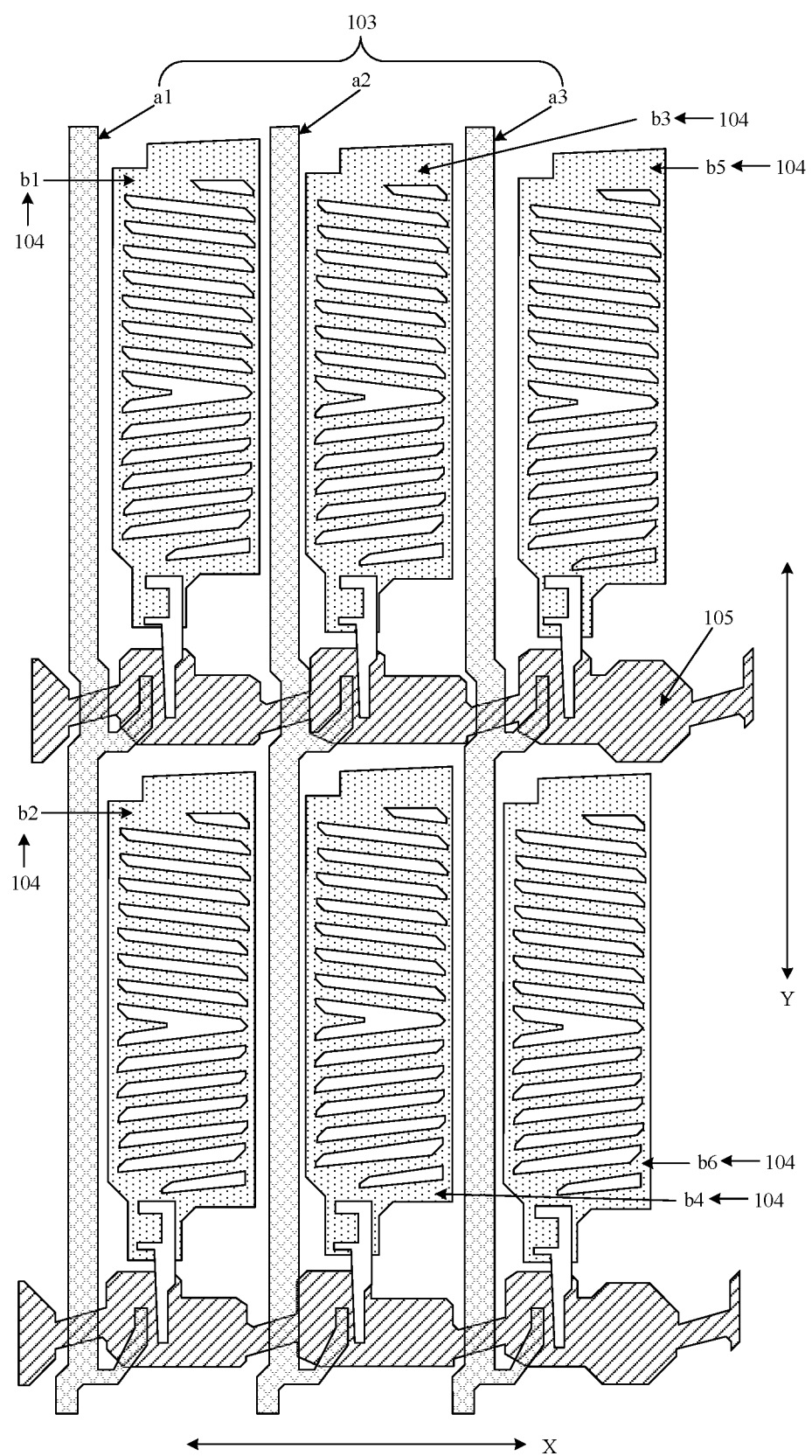
FIG. 4 is a top view of an array substrate according to an embodiment of the present disclosure.

In an exemplary embodiment, two common electrodes 102 (102a and 102b), one data line 103, and two pixel electrodes 104 (104a and 104b) are illustrated in FIG. 3. FIG. 4 is a front view of an array substrate according to an embodiment of the present disclosure. A total of six pixel electrodes 104 are illustrated in FIG. 4.

In some embodiments of the present disclosure, an orthographic projection of each of the data lines 103 on the base substrate 101 may not be overlapped with an orthographic projection of any of the common electrodes 102 on the base substrate 101. In addition, with respect to each of the data lines 103, a distance m1 between the data line 103 and a first target common electrode 102a may be different from a distance m2 between the data line 103 and a second target common electrode 102b, and the first target common electrode 102a and the second target common electrode 102b may be respectively disposed on two sides of the data lines 103. In the array substrate 10 illustrated in FIG. 3, a distance m1 between one of the data lines 103 and a first target common electrode 102a is greater than a distance m2 between the data line and a second target common electrode 102b.

In some embodiments of the present disclosure, the distance between each of the data lines 103 and the common electrode 102 may be adjusted by determining the degree of interference on two sides of the pixel electrode 104 from the coupled electric field of the data line 103 and the common electrode 102, such that the distance m1 between the data line 103 and the first target common electrode 102a is different from the distance m2 between the data line 103 and the second target common electrode 102b. Therefore, the two sides of each pixel electrode 104 may be subject to the same interference. In this way, it is ensured that display regions in the array substrate that correspond to the two sides of the pixel electrode are consistent in luminance, and thus the display device achieves a better luminance consistency and a better display effect.

In an exemplary embodiment, in the case that the coupled electric field between the data line 103 and the common electrode 102 interferes with the pixel electrode 104 to a greater degree, a distance between the common electrode 102 disposed on a same side of the data line 103 as the pixel electrode 104 and the data line 103 may be set to be larger, thereby reducing the degree of interference on the pixel electrode 104 from the coupled electric field between the data line 103 and the common electrode 102.

In the case that the coupled electric field between the data line 103 and the common electrode 102 causes less interference to the pixel electrode 104, the distance between the common electrode 102 disposed on the same side of the data line 103 as the pixel electrode 104 and the data line 103 may be decreased, such that the interference caused by the coupled electric field between the data line 103 and the common electrode 102 to a side of the pixel electrode 104 is increased. Therefore, the two sides of the pixel electrode 104 may be subject to the interference of the same magnitude.

Referring to FIG. 3 and FIG. 4, an orthographic projection of each pixel electrode 104 on the base substrate 101 may not be overlapped with an orthographic projection of any data line 103 on the base substrate 101.

Each column of pixel electrodes may be connected to one data line 103. That is, each of the data lines 103 may be disposed between two adjacent columns of pixel electrodes and be connected to one column of pixel electrodes in the two adjacent columns of pixel electrodes, wherein the data line 103 may be configured to supply a data signal to one column of pixel electrodes connected thereto.

In an exemplary embodiment, three data lines 103 and three columns of pixel electrodes are illustrated in FIG. 4. The first column of pixel electrodes includes a first pixel electrode bit and a second pixel electrode b2. The second column of pixel electrodes includes a third pixel electrode b3 and a fourth pixel electrode b4. The three column of pixel electrodes includes a fifth pixel electrode b5 and a sixth pixel electrode, b6. A first data line a1 may be connected to each of the pixel electrodes in the first column of pixel electrodes. That is, the first data line a1 is connected to the first pixel electrode b1 and the second pixel electrode b2. A second data line a2 may be connected to each of the pixel electrodes in the second column of pixel electrodes. That is, the second data line a2 is connected to the third pixel electrode b3 and the fourth pixel electrode b4. A third data line a3 may be connected to each of the pixel electrodes in the third column of pixel electrodes. That is, the third data line a3 is connected to the fifth pixel electrode b5 and the sixth pixel electrode b6.

Referring to FIG. 3, with respect to each of the data lines 103, a distance n1 between the data line 103 and the first target pixel electrode 104a is different from a distance n2 between the data line 103 and the second target pixel electrode 104b, and the first target pixel electrode 104a and the second target pixel electrode 104b may be respectively disposed on two sides of the data line 103. In addition, the data line 103 may be connected to one pixel electrode 104 of the first target pixel electrode 104a and the second target pixel electrode 104b.

Since the distances between the data line 103 and the first target pixel electrode 104a as well as the second target pixel electrode 104b disposed on the two sides of the data line 103 are equal, a coupling capacitance between the data line 103 and the first target pixel electrode 104a is equal to a coupling capacitance between the data line 103 and the second target pixel electrode 104b, and thus the display device achieves a better display effect.

Optionally, the distance n1 between the data line 103 and the first target common electrode 104a and the distance n2 between the data line 103 and the second target pixel electrode 104h may both range from 4.5 µm to 6 µm. For example, n1=n2=5 µm.

In summary, some embodiments of the present disclosure provide an array substrate. The array substrate includes a base substrate, a plurality of common electrodes, a plurality of data lines, and a plurality of pixel electrodes arranged in an array. With respect to each of the data lines, a distance between the data line and a first target common electrode is different from a distance between the data line and a second target common electrode, such that two sides of each of the pixel electrodes are subject to the same interference. In this way, it is ensured that display regions in the array substrate that correspond to the two sides of the pixel electrode are consistent in luminance, and thus the display device achieves a better display effect. In addition, with respect to each of the data, lines, a distance between the data line and a first target pixel electrode is equal to a distance between the data line and a second target pixel electrode, wherein the first target pixel electrode and the second target pixel electrode are disposed on two sides of the data line, such that coupling capacitances of the pixel electrodes on two sides of the data line relative to the data line are equal, and thus the display device achieves a better display effect.

In some embodiments of the present disclosure, the plurality of common electrodes 102 and the plurality of pixel electrodes 104 may be both made of an indium tin oxide (ITO) material.

In some embodiments of the present disclosure, with respect to each of the data lines 103, the distance m1 between the data line 103 and the first target common electrode 1102a may be greater than the distance m2 between the data line 103 and the second target common electrode 102b. In addition, an orthographic projection of the pixel electrode 104 connected to the data line 103 on the base substrate 101 at least partially overlaps with an orthographic projection of the first target common electrode 102a on the base substrate 101. That is, the pixel electrode 104 connected to the data line 103 and the first target common electrode 102a may be disposed on a same side of the data line 103.

Among the two pixel electrodes 104 on the two sides of the data line 103, the pixel electrode 104 connected to the data line 103 is more susceptible to interference from a coupled electric field between the data line 103 and the common electrode 102. For example, in the case that the data line 103 in FIG. 3 is connected to the first target pixel electrode 104a disposed on the left side of the data line 103, the coupled electric field between the data line 103 and the common electrode 102 interferes with the first target pixel electrode 104a to a greater degree, and interferes with the second target pixel electrode 104b on the right side of the data line 103 to a smaller degree.

Therefore, with respect to one pixel electrode 104 (e.g., the first target pixel electrode 104a) connected to the data line 103 among the pixel electrodes 104 on the two sides of the data line 103, the distance between one common electrode 102 (e.g., the first target common electrode 102a), disposed on the same side of the data line 103 as the first target pixel electrode 104a, among the common electrodes 102 on the two sides of the data line 103 and the data line 103 is increased; and the distance between the other common electrode 102 (e.g., the second target common electrode 102b), disposed on the different side of the data line 103 as the first target pixel electrode 104a, among the common electrodes 1102 on the two sides of the data line 103 and the data line 103 is decreased. Therefore, the problem that display regions in the array substrate that correspond to two sides of the pixel electrode 104 are greatly different in luminance can be avoided, and thus the display device achieves a constant luminance and a better display effect.

Optionally, with respect to each of the data lines 103, the distance m1 between the data line 103 and the first target common electrode 102*a* may range from 3.5 µm to 4.5 µm. The distance m2 between the data line 103 and the second target common electrode 102*b* may range from 0.5 µm to 1.5 µm.

In an exemplary embodiment, the distance m1 between the data line 103 and the first target common electrode 102*a* may be 3.5 µm. The distance m2 between the data line 103 and the second target common electrode 102*b* may range be 1.5 µm.

Figure 5:
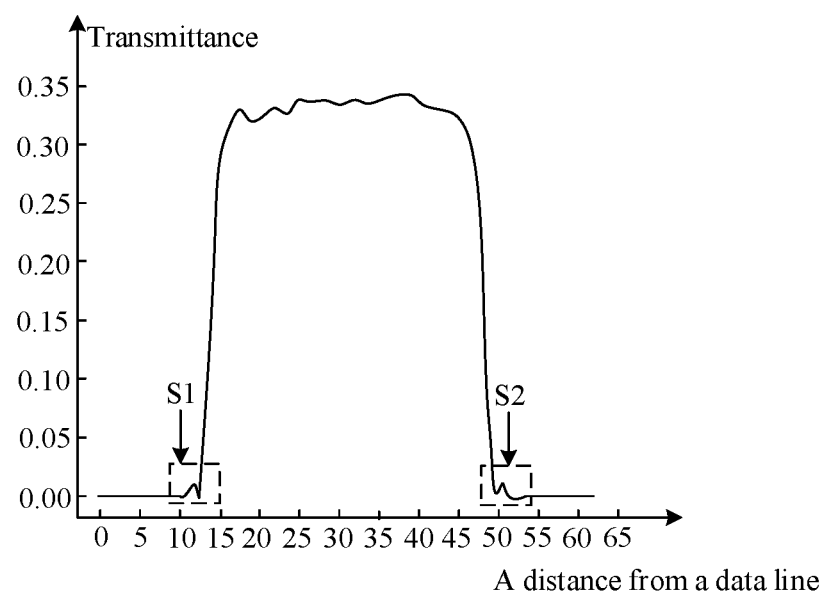
FIG. 5 is a schematic diagram of a transmittance curve of a pixel electrode in an embodiment of the present disclosure.

In some embodiments of the present disclosure, transmittance curves of the pixel electrode 104 provided by the embodiments of the present disclosure may be acquired by using simulation software. As illustrated in FIG. 5, transmittance curves of a first region S1 and a second region S2 on two sides of the pixel electrode 104 are identical, that is, the transmittances on the two sides of the pixel electrode 104 have no difference therebetween. The two sides of the pixel electrode 104 are subject to the same interference from a coupled electric field. In this way, it is ensured that display regions in the array substrate that correspond to the two sides of the pixel electrode 104 are consistent in luminance, and thus the display device achieves a better display effect. In addition, the problems such as USD image persistence, horizontal stripes and trace mum in the display device can be avoided.

In some embodiments of the present disclosure, referring to FIG. 3, a distance between the data line 103 and the pixel electrode 104 may be equal to a sum of a distance between the data line 103 and the common electrode 102 and a distance between the common electrode 102 and the pixel electrode 104. For example, the distance n1 between the data line 103 and the first target pixel electrode 104*a* may be equal to the sum of the distance m1 between the data line 103 and the first target common electrode 102*a*, and a distance r1 between the first target common electrode 102*a* and the first target pixel electrode 104*a*, that is, n1=m1+r1. In addition, the distance n2 between the data line 103 and the second target pixel electrode 104*b* may be equal to a sum of the distance m2 between the data line 103 and the second target common electrode 102*b*, and a distance r2 between the second target common electrode 102*b* and the second target pixel electrode 104*b*, that is, n2=m2+r2.

In an exemplary embodiment, in the case that the distance n1 between the data line 103 and the first target pixel electrode 104*a*, and the distance n2 between the data line 103 and the second target pixel electrode 104*b* are both 5 µm, the distance m1 between the data line 103 and the first target common electrode 1102*a* is 3.5 µm, and the distance m2 between the data line 103 and the second target common electrode 102*b* is 1.5 µm, then the distance between the first target common electrode 102*a* and the first target pixel electrode 104*a* is r1=n1−m1=5 µm−3.5 µm=1.5 µm, and the distance between the second target common electrode 102*h* and the second target pixel electrode 104*h* is r2=n2−m2=5 µm−1.5 µm=3.5 µm.

Referring to FIG. 3, the plurality of common electrodes 102, the plurality of data lines 103, and the plurality of pixel electrodes 104 may be sequentially stacked on a side distal from the base substrate 101. That is, the plurality of common electrodes 102 may be disposed on a side of the base substrate 101, the plurality of data lines 103 may be disposed on the side, distal from the base substrate 101, of the plurality of common electrodes 102, and the plurality of pixel electrodes 104 may be disposed on a side, distal from the plurality of common electrodes 102, of the plurality of data lines 103. The plurality of common electrodes 102, the plurality of data lines 103, and the plurality of pixel electrodes 104 may also be stacked in other manners, which is not limited in the embodiments of the present disclosure.

For example, the plurality of common electrodes 104, the plurality of data lines 103, and the plurality of pixel electrodes 102 may be sequentially stacked on a side distal from the base substrate 101. That is, the plurality of pixel electrodes 104 may be disposed on a side of the base substrate 101, the plurality of data lines 1103 may be disposed on the side, distal from the base substrate 101, of the plurality of pixel electrodes 104, and the plurality of common electrodes 102 may be disposed on a side, distal from the plurality of pixel electrodes 104, of the plurality of data lines 103.

Referring to FIG. 3 and FIG. 4, the array substrate 10 further includes a plurality of gate lines 105 and a gate insulating layer 106. The plurality of gate lines 105 may be disposed on a side of the base substrate 101, and an extension direction X of each of the gate lines 105 may be intersected with an extension direction Y of any of the data lines 103; and each of the gate lines 105 may be connected to a row of pixel electrodes 104. The gate insulating layer 106 may be disposed on a side, distal from the base substrate 101, of the plurality of gate lines 105. Two gate lines 105 and three data lines 103 are illustrated in FIG. 4, wherein an extension direction X of each of the gate lines 105 may be perpendicular to an extension direction Y of any data line 103.

It should be noted that, since the extension direction X of each of the gate lines 105 may be intersected with the extension direction Y of any of the data lines 103, the gate line 105 is not illustrated in the case that a cross section of the data line 103 is illustrated in FIG. 5.

Still referring to FIG. 3, the array substrate 10 may further include a passivation layer (PVX) 107. The passivation layer 107 may be disposed on a side, distal from the base substrate 101, of the plurality of common electrodes 102. That is, the passivation layer 107 may be disposed between the plurality of common electrodes 102 and the plurality of pixel electrodes 104.

It should be noted that the array substrate 10 may further include a plurality of transistors (not illustrated). With respect to each of the transistors, a gate of the transistor may be connected to the gate line 105, a source of the transistor may be connected to the data line 103, and a drain of the transistor may be connected to the pixel electrode 104.

In summary, some embodiments of the present disclosure provide an array substrate. The array substrate includes a base substrate, a plurality of common electrodes, a plurality of data lines, and a plurality of pixel electrodes arranged in an array. With respect to each of the data lines, a distance between the data line and a first target common electrode is different from a distance between the data line and a second target common electrode, such that two sides of each of the pixel electrodes are subject to the same interference. In this way, it is ensured that display regions in the array substrate that correspond to the two sides of the pixel electrode are consistent in luminance, and thus the display device achieves a better display effect. In addition, with respect to each of the data lines, the distance between the data line and the first target pixel electrode is equal to the distance between the data line and the second target pixel electrode, wherein the first target pixel electrode and the second target pixel electrode are disposed on two sides of the data line, such that coupling capacitances of the pixel electrodes on the two sides of the data line relative to the data line are identical, and thus the display device achieves a better display effect.

Figure 6:
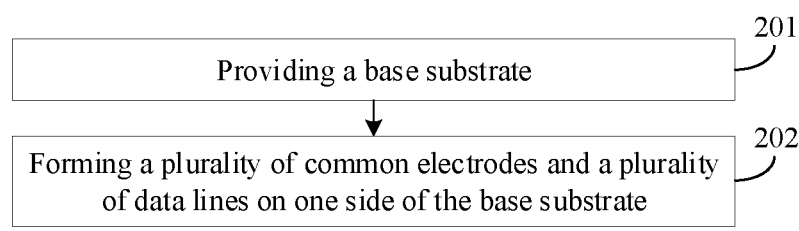
FIG. 6 is a flowchart of a method for manufacturing an array substrate according to an embodiment of the present disclosure.

FIG. 6 is a flowchart of a method for manufacturing an array substrate according to an embodiment of the present disclosure. This method may be configured to prepare the array substrate provided in the above embodiments. For example, this method is described by taking the preparation of the array substrate illustrated in FIG. 3 as an example. Referring to FIG. 6, the method may include the following steps.

In S201, a base substrate is provided.

The base substrate 101 may be a transparent glass substrate.

In S202, a plurality of common electrodes, a plurality of data lines, and a plurality of pixel electrodes arranged in an array are formed on a side of the array substrate.

In this embodiment of the present disclosure, a plurality of common electrodes 102 may be formed on a side of the base substrate 101 first; a plurality of data lines 103 is then formed on a side, distal from the base substrate 101, of the plurality of common electrodes 102; and finally, a plurality of pixel electrodes 104 arranged in an array are formed on a side, distal from the base substrate 101, of the plurality of data lines 103. Alternatively, the plurality of pixel electrodes 104 arranged in an array may be formed on a side of the base substrate 101 first; the plurality of data lines 103 are then formed on a side, distal from the base substrate 101, of the plurality of pixel electrodes 104; and finally, the plurality of common electrodes 102 are formed on a side, distal from the base substrate 101, of the plurality of data lines 103. The sequence of forming the plurality of common electrodes 102 and the plurality of data lines 103 is not limited in the embodiments of the present disclosure.

Referring to FIG. 3, the orthographic projection of each of the data lines 103 on the base substrate 101 may not be overlapped with the orthographic projection of any common electrode 102 on the base substrate 101. In addition, with respect to each of the data lines 103, the distance m1 between the data line 103 and the first target common electrode 102*a* may be different from the distance m2 between the data line 103 and the second target common electrode 102*b*, and the first target common electrode 102*a* and the second target common electrode 102*b* are respectively disposed on two sides of the data line 103.

Referring to FIG. 3 and FIG. 4, the orthographic projection of each of the pixel electrodes 104 on the base substrate 101 may not be overlapped with the orthographic projection of any of the data lines 103 on the base substrate 101.

Each column of pixel electrodes may be connected to one data line 103. That is, each of the data lines 103 may be disposed between two adjacent columns of pixel electrodes and connected to one column of pixel electrodes in the two adjacent columns of pixel electrodes; and the data line 103 may be configured to supply a data signal to one column of pixel electrodes connected thereto.

Referring to FIG. 3, with respect to each of the data lines 103, the distance n1 between the data line 103 and the first target pixel electrode 104*a* may be equal to the distance n2 between the data line 103 and the second target pixel electrode 104*b*, and the first target pixel electrode 104*a* and the second target pixel electrode 104*b* may be respectively disposed on the two sides of the data line 103. In addition, the data line 103 may be connected to one pixel electrode 104 of the first target pixel electrode 104*a* and the second target pixel electrode 104*b*.

Since the distances between the data line 103 and the first target pixel electrode 104*a* as well as the second target pixel electrode 104*b* on the two sides of the data line 103 are identical, a coupling capacitance between the data line 103 and the first target pixel electrode 104*a* is equal to a coupling capacitance between the data line 103 and the second target pixel electrode 104*b*, and thus the display device achieves a better display effect.

In some embodiments, the distance n1 between the data line 103 and the first target common electrode 104*a* and the distance n2 between the data line 103 and the second target pixel electrode 104*b* may range from 4.5 µm to 6 µm, respectively. For example, n1=n2=5 µm.

In summary, some embodiments of the present disclosure provide a method for manufacturing the array substrate. In the array substrate manufactured by this method, with respect to each of the data lines, the distance between the data line and the first target common electrode is different from the distance between the data line and the second target common electrode, such that two sides of each of the pixel electrodes are subject to the same interference. In this way, it is ensured that display regions in the array substrate that correspond to the two sides of the pixel electrode are consistent in luminance, and thus the display device achieves a better display effect. In addition, with respect to each of the data lines, the distance between the data line and the first target pixel electrode is equal to the distance between the data line and the second target pixel electrode, wherein the first target pixel electrode and the second target pixel electrode are disposed on the two sides of the data line, such that coupling capacitances of the pixel electrodes on the two sides of the data line relative to the data line are identical, and thus the display device achieves a better display effect.

Figure 7:
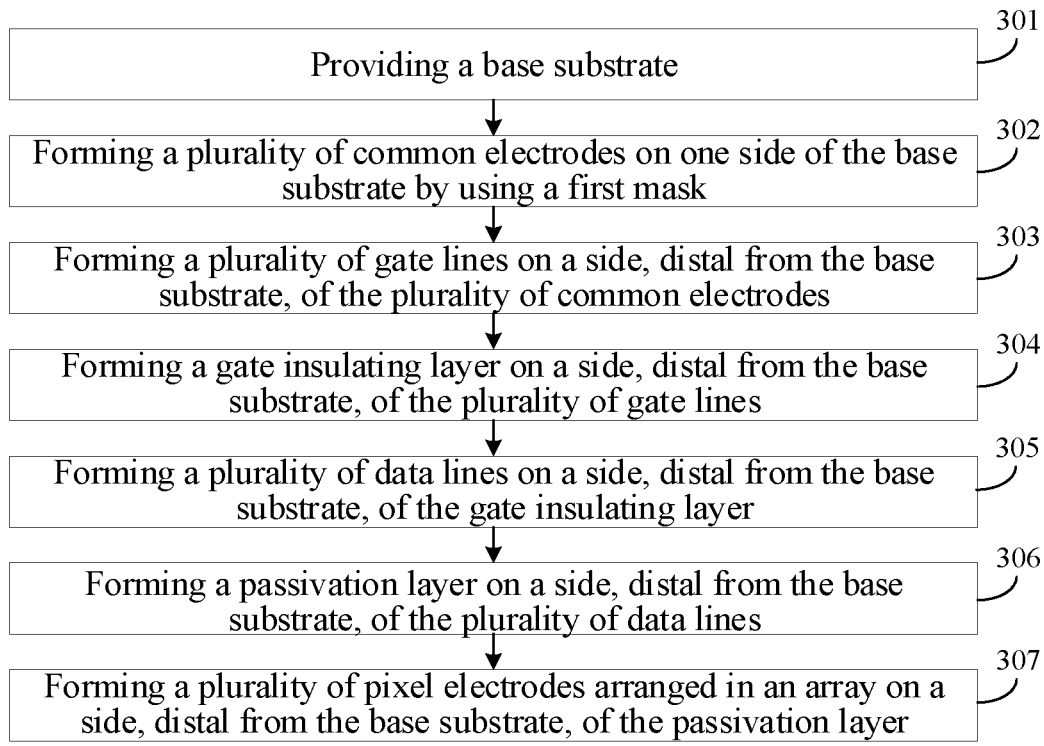
FIG. 7 is a flowchart of a method for manufacturing another array substrate according to an embodiment of the present disclosure.

FIG. 7 is a flowchart of a method for manufacturing another array substrate according to an embodiment of the present disclosure. This method may be configured to prepare the array substrate provided in the above embodiments. Referring to FIG. 7, the method may include the following steps.

In S301, a base substrate is provided.

The base substrate 101 may be a transparent glass substrate.

In S302, a plurality of common electrodes are formed on a side of the base substrate by using a first mask.

Figure 8:
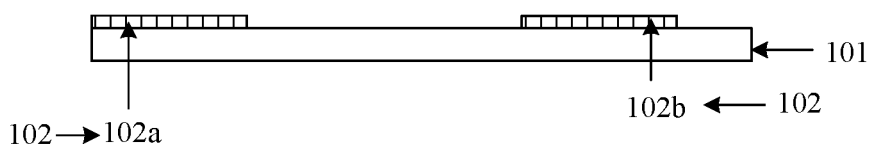
FIG. 8 is a schematic diagram of forming a plurality of common electrodes according to an embodiment of the present disclosure.

In some embodiments of the present disclosure, referring to FIG. 8, a plurality of common electrodes may be formed on a side of the base substrate by means of a patterning process. The patterning process may include: photoresist (PR) coating, exposure, development, etching, photoresist stripping and the like. In addition, coated photoresist may be exposed by using the first mask. Moreover, the plurality of common electrodes 102 may be made of an ITO material.

A position where the first mask is disposed is offset by a target distance relative to a first initial position in a direction perpendicular to the data lines 103. Optionally, the target distance may range from 1 µm to 2 µm.

The first initial position may be a position where the first mask is disposed in the case that a plurality of common electrodes are prepared in the related art. However, in some embodiments of the present disclosure, by offsetting the position where the first mask is disposed, relative to the first initial position, by the target distance in the direction perpendicular to the data lines 103, the distances between each of the subsequently formed data lines 103 and the common electrodes 102 on the two sides of the data line 103 may be different. In this way, it is ensured that the display regions corresponding to two sides of the pixel electrode 104 in the array substrate 10 are consistent in luminance, and thus the display device achieves a better display effect.

In S303, a plurality of gate lines are formed on a side, distal from the base substrate, of the plurality of common electrodes.

In some embodiments of the present disclosure, a plurality of gate lines 105 may be formed on a side, distal from the base substrate, of the plurality of common electrodes 102 by means of the patterning process. The plurality of gate lines in the embodiments of the present disclosure may be prepared by using a third mask. In addition, a position where the third mask is disposed may be the same as a third initial position of the third mask for preparing the gate lines in the related art.

In S304, a gate insulating layer is formed on a side, distal from the base substrate, of the plurality of gate lines.

Figure 9:
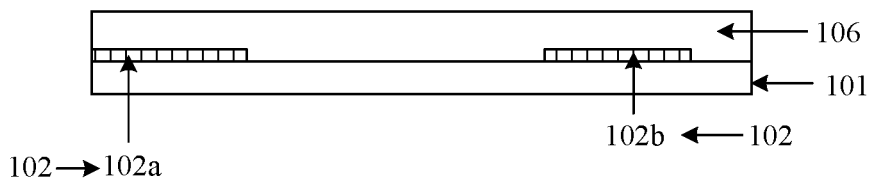
FIG. 9 is a schematic diagram of forming a gate insulating layer according to an embodiment of the present disclosure.

In some embodiments of the present disclosure, referring to FIG. 9, a gate insulating layer 106 may be formed on a side, distal from the base substrate 101, of the plurality of gate lines in the case that the plurality of gate lines are prepared.

In S305, a plurality of data lines are formed on a side, distal from the base substrate, of the gate insulating layer.

Figure 10:
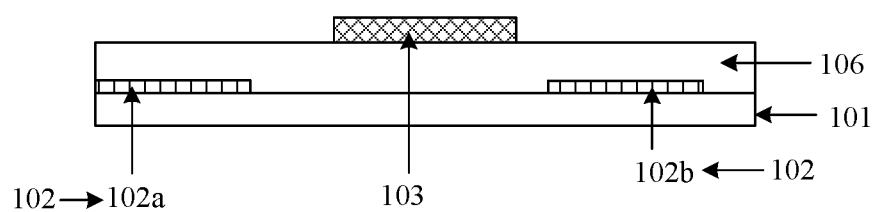
FIG. 10 is a schematic diagram of forming a plurality of data lines according to an embodiment of the present disclosure.

In some embodiments of the present disclosure, referring to FIG. 10, a plurality of data lines 103 may be formed on a side, distal from the base substrate 101, of a gate insulating layer 106 by means of image processing after the gate insulating layer 106 is acquired. Coated photoresist may be exposed by using a second mask. In addition, a position where the second mask is disposed may be the same as a second initial position of a second mask for preparing data lines in the related art.

In S306, a passivation layer is formed on a side, distal from the base substrate, of the plurality of data lines.

Figure 11:
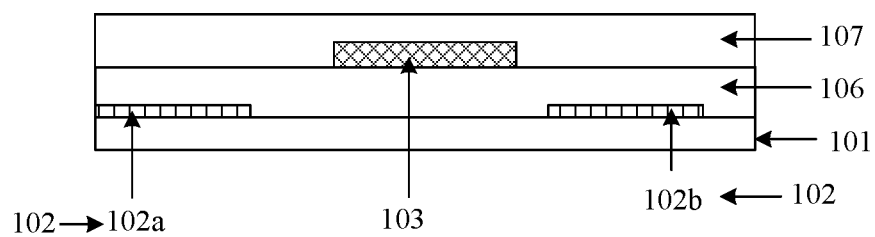
FIG. 11 is a schematic diagram of forming a passivation layer according to an embodiment of the present disclosure.

In some embodiments of the present disclosure, referring to FIG. 11, a passivation layer 107 may be formed on a side, distal from the base substrate 101, of the plurality of data lines in the case that the plurality of data lines 103 are prepared.

In S307, a plurality of pixel electrodes arranged in an array are formed on a side, distal from the base substrate, of the passivation layer.

In some embodiments of the present disclosure, a plurality of pixel electrodes 104 may be formed on a side, distal from the base substrate 101, of the passivation layer by means of the patterning process. The pixel electrodes in some embodiments of the present disclosure may be prepared by using a fourth mask. In addition, a position where the fourth mask is disposed may be the same as a fourth initial position of a fourth mask for preparing the gate lines in the related art. Moreover, the plurality of pixel electrodes 104 may be made of the ITO material.

In addition, referring to FIG. 3, the orthographic projection of each of the pixel electrodes 104 on the base substrate 101 may not be overlapped with the orthographic projection of any of the data lines 103 on the base substrate 101; and each column of pixel electrodes 104 is connected to one data line 103.

It should be noted that a sequence of the steps of the method for manufacturing the array substrate according to the embodiment of the present disclosure may be adjusted appropriately, and the steps may also be increased or decreased accordingly according to the situation. For example, S307 may be exchanged with S302. Within the technical scope disclosed in the present disclosure, any variations of the method easily derived by a person of ordinary skill in the art shall fall within the protection scope of the present disclosure, which is not repeated here.

In summary, some embodiments of the present disclosure provide a method for manufacturing the array substrate. In the case that the plurality of common electrodes are prepared by using the method, the position where the first mask is disposed is offset by a target distance relative to the first initial position in an extension direction perpendicular to the data line, such that the distances between each of a plurality of subsequently formed data lines and the common electrodes on two sides of the data line are different. Therefore, two sides of each of the pixel electrodes are subject to the same interference. In this way, it is ensured that display regions in the array substrate that correspond to the two sides of the pixel electrode are consistent in luminance, and thus the display device achieves a better display effect.

Figure 12:
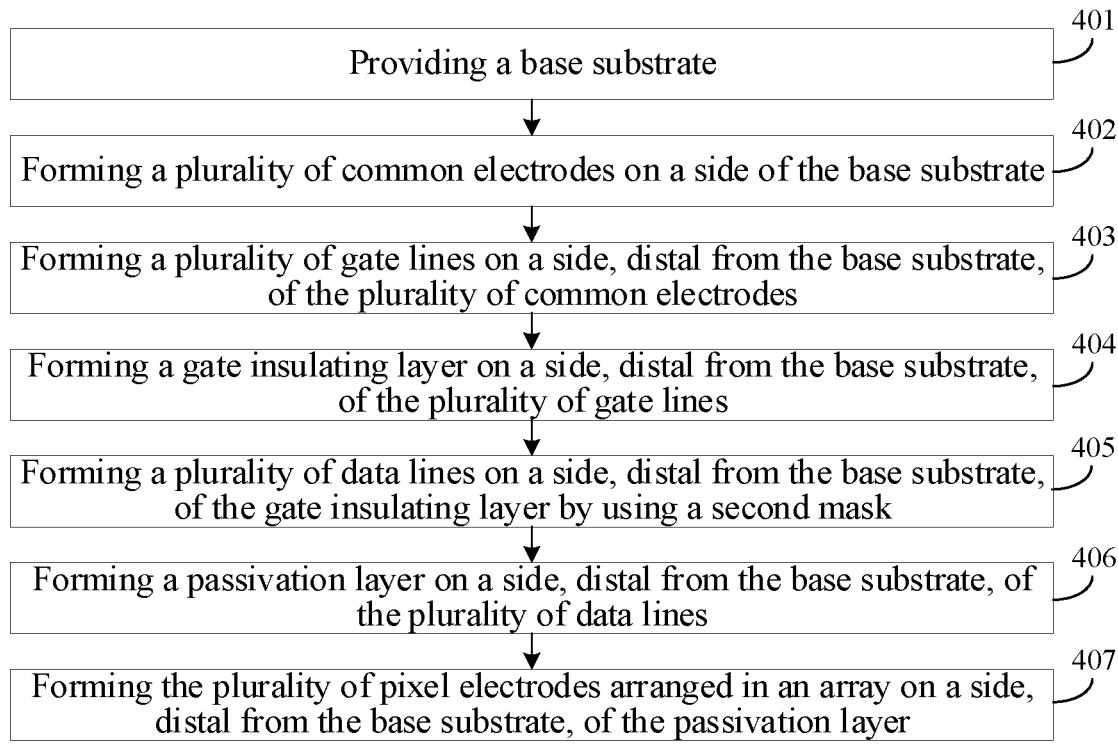
FIG. 12 is a flowchart of a method for manufacturing yet another array substrate according to an embodiment of the present disclosure.

FIG. 12 is a flowchart of a method for manufacturing yet another array substrate according to an embodiment of the present disclosure. Referring to FIG. 12, the method may include the following steps.

In S401, a base substrate is provided.

The base substrate 101 may be a transparent glass substrate.

In S402, a plurality of common electrodes are formed on a side of the base substrate.

Figure 13:
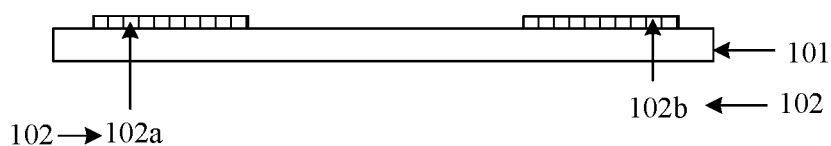
FIG. 13 is another schematic diagram of forming a plurality of common electrodes according to an embodiment of the present disclosure.

In some embodiments of the present disclosure, referring to FIG. 13, a plurality of common electrodes 102 may be formed on a side of the base substrate 101 by means of the patterning process. The patterning process may include photoresist coating, exposure, development, etching, photoresist stripping and the like. In addition, coated photoresist may be exposed by using the first mask. Moreover, the plurality of common electrodes 102 may be made of the ITO material.

A position where the first mask is disposed may be the same as a first initial position of a first mask for preparing the plurality of common electrodes 102 in the related art.

In S403, a plurality of gate lines are formed on a side, distal from the base substrate, of the plurality of common electrodes.

A plurality of gate lines may be formed on a side, distal from the base substrate, of the plurality of common electrodes. In addition, the method for manufacturing the plurality of gate lines may refer to the foregoing S303, which is not repeated in the embodiment of the present disclosure.

In S404, a gate insulating layer is formed on a side, distal from the base substrate, of the plurality of gate lines.

Figure 14:
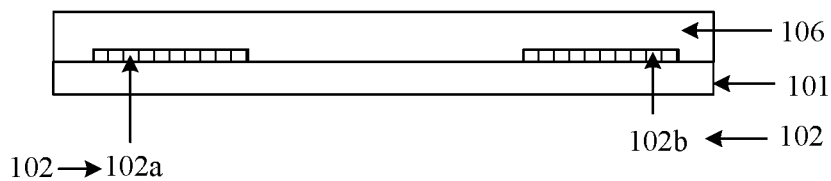
FIG. 14 is another schematic diagram of forming a gate insulating layer according to an embodiment of the present disclosure.

Referring to FIG. 14, the gate insulating layer may be formed on a side, distal from the base substrate, of the plurality of gate lines. In addition, the method for manufacturing the gate insulating layer may refer to the foregoing S304, which is not repeated in the embodiments of the present disclosure.

In S405, a plurality of data lines are formed on a side, distal from the base substrate, of the gate insulating layer by using the second mask.

Figure 15:
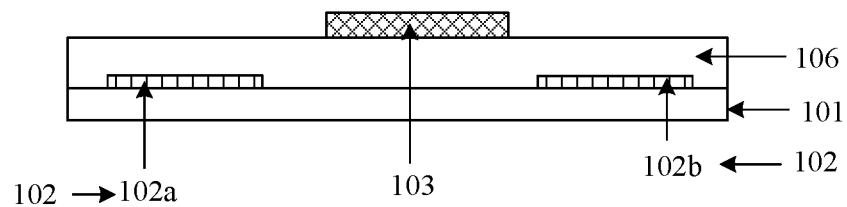
FIG. 15 is another schematic diagram of forming a plurality of data lines according to an embodiment of the present disclosure.

In some embodiments of the present disclosure, referring to FIG. 15, a plurality of data lines 103 may be formed on a side, distal from the base substrate 101, of a gate insulating layer 106 by means of the patterning processing. In addition, coated photoresist may be exposed by using the second mask.

The position where the second mask is disposed is offset by a target distance relative to a second initial position in a direction perpendicular to the data lines 103. In some embodiments, the target distance may range from 1 μm to 2 μm.

The second initial position may be a position where the second mask is disposed in the case that the plurality of data lines are prepared in the related art. However, in some embodiments of the present disclosure, by offsetting the position where the second mask is disposed, relative to the second initial position, by the target distance in the direction perpendicular to the data lines 103, the distances between each of the data lines 103 and the common electrodes 102 on two sides of the data line 103 may be different. In this way, it is ensured that display regions in the array substrate that correspond to the two sides of the pixel electrode are consistent in luminance, and thus the display device achieves a better display effect.

In S406, a passivation layer is formed on a side, distal from the base substrate, of the plurality of data lines.

Figure 16:
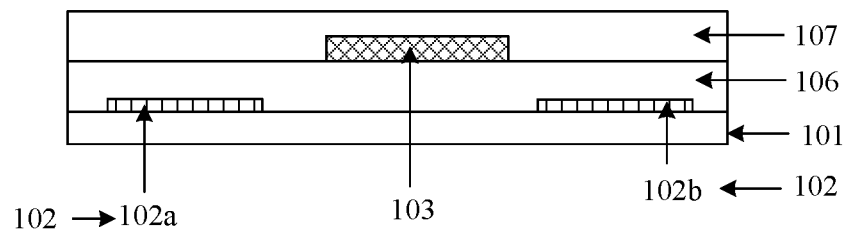
FIG. 16 is another schematic diagram of forming a passivation layer according to an embodiment of the present disclosure.

Referring to FIG. 16, a passivation layer is formed on a side, distal from the base substrate, of the plurality of data lines. In addition, alignment may be performed according to a plurality of data lines 103 formed in S405 in the case that the passivation layer is formed.

In S407, a plurality of pixel electrodes arranged in an array are formed on a side, distal from the base substrate, of the passivation layer.

In some embodiments of the present disclosure, the plurality of pixel electrodes 104 may be formed on a side, distal from the base substrate 101, of the passivation layer by means of the patterning process. In addition, alignment may be performed according to the plurality of data lines 103 formed in S405 in the case that the plurality of pixel electrodes 104 is formed. That is, in the case that coated photoresist is exposed by using the fourth mask, the position where the fourth mask is disposed is offset by a target distance relative to a fourth initial position in an extension direction perpendicular to the data lines 103. In addition, an offset direction of the fourth mask may be the same as an offset direction of the second mask. Moreover, the plurality of pixel electrodes 104 may be made of the ITO material.

Figure 17:
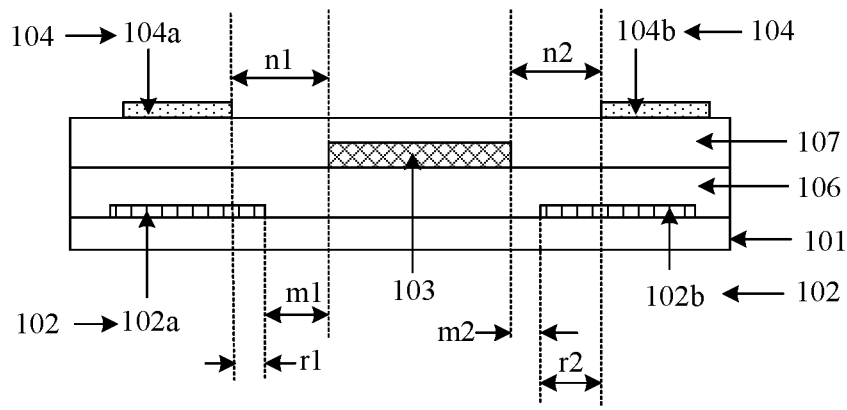
FIG. 17 is a schematic structural diagram of yet another array substrate according to an embodiment of the present disclosure.

Referring to FIG. 17, an orthographic projection of each of the pixel electrodes 104 on a base substrate 101 may not be overlapped with an orthographic projection of any of the data lines 103 on the base substrate 101; and each column of pixel electrodes 104 is connected to one data line 103.

It should be noted that the sequence of the steps of the method for manufacturing the array substrate according to some embodiments of the present disclosure may be adjusted appropriately, and the steps may also be increased or decreased accordingly according to the situation. For example, S407 may be exchanged with S402. Within the technical scope disclosed in the present disclosure, any variations of the method easily derived by a person of ordinary skill in the art shall fall within the protection scope of the present disclosure, which is not repeated here.

In summary, some embodiments of the present disclosure provide a method for manufacturing the array substrate. In the case that the plurality of data lines are prepared by using the method, the position where the second mask is disposed is offset by the target distance relative to the second initial position in the extension direction perpendicular to the data line, such that the distances between each of the data lines and the common electrodes on two sides of the data line are different. Therefore, two sides of each of the pixel electrodes are subject to the same interference. In this way, it is ensured that display regions in the array substrate that correspond to the two sides of the pixel electrode are consistent in luminance, and thus the display device achieves a better display effect.

Figure 18:
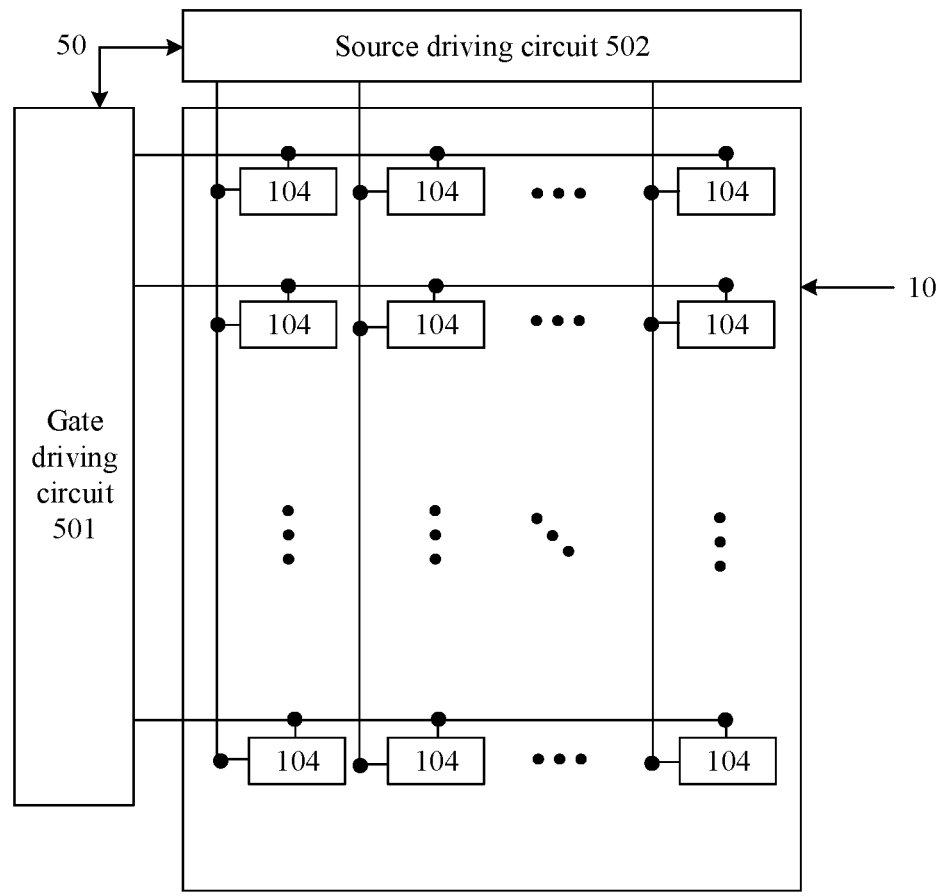
FIG. 18 is a schematic structural diagram of a display device according to an embodiment of the present disclosure.

FIG. 18 is a schematic structural diagram of a display device provided by an embodiment of the present disclosure. Referring to FIG. 18, the display device may include a driving circuit 50 and the array substrate 10 provided in the above embodiments.

Referring to FIG. 18, the driving circuit 50 may include a gate driving circuit 501 and a source driving circuit 502. The gate driving circuit 501 may be connected to each row of pixel electrodes 104 in the array substrate 10 through gate lines 105, and is configured to supply a gate driving signal to each row of pixel electrodes 104. The source driving circuit 502 may be connected to each column of pixel electrodes 104 in the array substrate 10 through data lines 103, and is configured to supply a data signal to each column of pixel electrodes 104.

Figure 19:
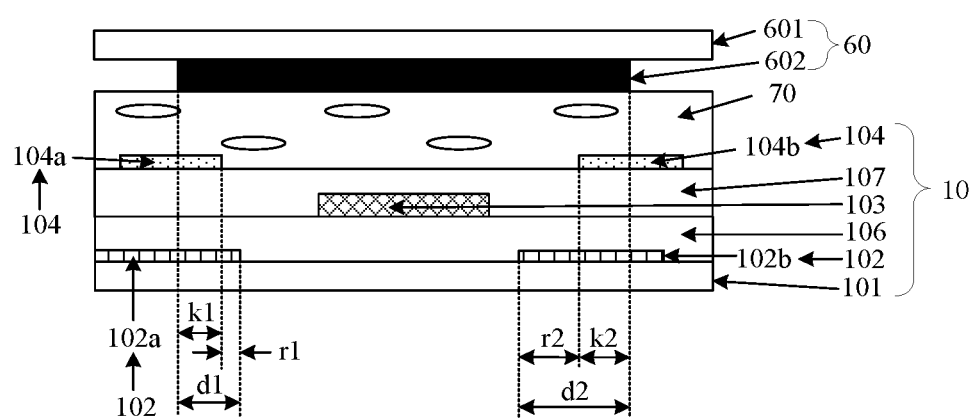
FIG. 19 is a schematic structural diagram of another display device according to an embodiment of the present disclosure.

FIG. 19 is a schematic structural diagram of another display device according to an embodiment of the present disclosure. Referring to FIG. 19, the display device may further include a color film substrate 60 and a liquid crystal layer 70. The liquid crystal layer 70 may be disposed between an array substrate 10 and the color film substrate 60.

The color filter substrate 60 may include a transparent glass substrate 601, and a black matrix (BM) layer 602 disposed on a side, proximal to the liquid crystal layer 70, of the glass substrate 601.

It should be noted that a distance between a black matrix layer 602 and a common electrode 102 may be equal to a sum of a distance between the black matrix layer 602 and a pixel electrode 104 and a distance between the common electrode 102 and the pixel electrode 104. For example, referring to FIG. 20, a distance d1 between a black matrix layer 602 and a first target common electrode 102a is equal to a sum of a distance k1 between the black matrix layer 602 and a first target pixel electrode 104a and a distance r1 between the first common electrode 102a, and the first target pixel electrode 104a, that is, d1=k1+r1. In addition, a distance d2 between the black matrix layer 602 and a second target common electrode 102b is equal to a sum of a distance k2 between the black matrix layer 602 and a second target pixel electrode 104b and a distance r2 between the second common electrode 102b and the second target pixel electrode 104b, that is, d2=k2+r2.

The array substrate 10 in the display device illustrated in FIG. 19 is manufactured through S301 to S307. However, the color film substrate 60 is aligned with data lines 103 in the array substrate 10 while being aligned with the array substrate 10 in a box-to-box manner. Therefore, a distance d1 between the black matrix layer 602 and a first target common electrode 102a is less than a distance between the black matrix layer 602 and a second target common electrode 102b.

In an exemplary embodiment, in the case that the distance k1 between the black matrix layer 602 and the first target pixel electrode 104a, and the distance k2 between the black matrix layer 602 and the second target pixel electrode 104b are both 2 μm; and the distance r1 between the first target common electrode 102a and the first target pixel electrode 104a is 1.5 μm, and the distance r2 between the second target common electrode 102b and the second target pixel electrode 104b is 3.5 μm. Therefore, the distance between the black matrix layer 602 and the first target common electrode 102a is d1=k1+r1=2 μm+1.5 μm=3.5 μm, and the distance between the black matrix layer 602 and the second target common electrode 102b is d2=k2+r2=2 μm+3.5 μm=5.5 μm.

Figure 20:
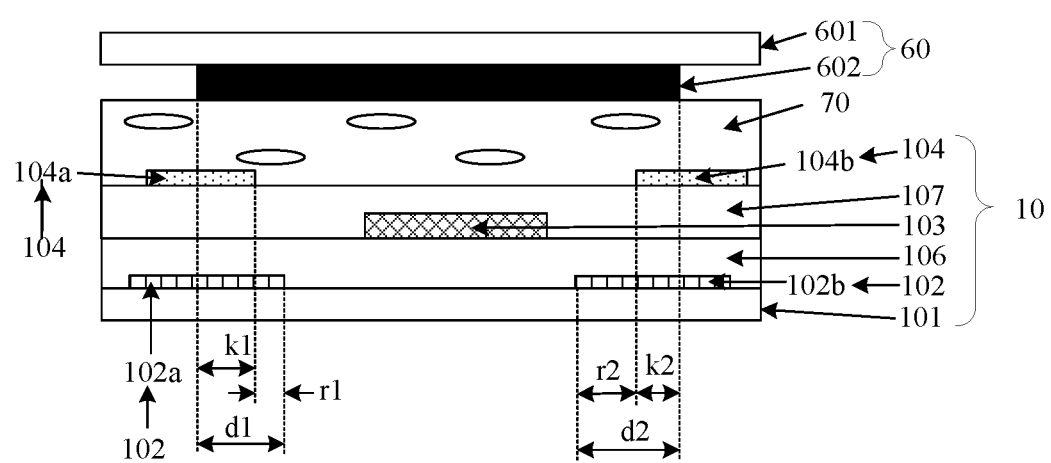
FIG. 20 is a schematic structural diagram of yet another display device according to an embodiment of the present disclosure.

In some embodiments of the present disclosure, the array substrate 10 in the display device illustrated in FIG. 20 is manufactured by using S401 to S407; and the color film substrate 60 is aligned with data lines 103 in the array substrate 10 while being aligned with the array substrate 10 in a box-to-box manner. Therefore, the distance d1 between the black matrix layer 602 and the first target common electrode 102a is equal to the distance between the black matrix layer 602 and the second target common electrode 102b.

In an exemplary embodiment, in the case that the distance k1 between the black matrix layer 602 and the first target pixel electrode 104a is 3 µm, the distance k2 between the black matrix layer 602 and the second target pixel electrode 104b is 1 µm; and the distance r1 between the first target common electrode 102a and the first target pixel electrode 104a is 1.5 µm, and the distance r2 between the second target common electrode 102b and the second target pixel electrode 104b is 3.5 µm. Therefore, the distance between the black matrix layer 602 and the first target common electrode 102a is d1=k1+r1=3 µm+1.5 µm=4.5 µm, and the distance between the black matrix layer 602 and the second target common electrode 102b is d2=k2+r2=1 µm+3.5 µm=4.5 µm.

Optionally, the display device may be any product or component having a display function, such as a liquid crystal display device, electronic paper, a mobile phone, a tablet computer, a television, a display, a notebook computer, a digital photo frame, a navigator or the like.

Described above are merely optional embodiments of the present disclosure, and are not intended to limit the present disclosure. Any modifications, equivalent substitutions, improvements, and the like may be made within the protection scope of the present disclosure, without departing from the spirit and principle of the present disclosure.

The invention claimed is:

1. An array substrate, comprising:
   a base substrate;
   a plurality of common electrodes disposed on a side of the base substrate;
   a plurality of data lines disposed on a side of the base substrate, wherein an orthographic projection of each of the data lines on the base substrate is not overlapped with an orthographic projection of any of the common electrodes on the base substrate; and with respect to each of the data lines, a distance between the data line and a first target common electrode is different from a distance between the data line and a second target common electrode, the first target common electrode being the second target common electrode are respectively disposed on two sides of the data line; and
   a plurality of pixel electrodes arranged in an array and disposed on a side of the base substrate, wherein an orthographic projection of each of the pixel electrodes on the base substrate is not overlapped with the orthographic projection of any of the data lines on the base substrate, and each column of the pixel electrodes is connected to one of the data lines;
   and with respect to each of the data lines, a distance between the data line and a first target pixel electrode is equal to a distance between the data line and a second target pixel electrode, the first target pixel electrode and the second target pixel electrode being respectively disposed on the two sides of the data line; and
   wherein with respect to each of the data lines, the distance between the data line and the first target common electrode is greater than the distance between the data line and the second target common electrode, and an orthographic projection of the pixel electrode connected to the data line on the base substrate at least partially is overlapped with an orthographic projection of the first target common electrode on the base substrate; and
   a distance between the second target common electrode and the second target pixel electrode is larger than a distance between the first target common electrode and the first target pixel electrode.

2. The array substrate according to claim 1, wherein both a distance between the data line and the first target pixel electrode and a distance between the data line and the second target pixel electrode range from 4.5 µm to 6 µm.

3. The array substrate according to claim 1, wherein a distance between the data line and the first target pixel electrode is smaller than a distance between the data line and the second target pixel electrode.

4. The array substrate according to claim 1, wherein the plurality of common electrodes, the plurality of data lines, and the plurality of pixel electrodes are sequentially stacked along a side distal from the base substrate.

5. The array substrate according to claim 1, wherein with respect to each of the data lines, the distance between the data line and the first target common electrode ranges from 3.5 µm to 4.5 µm; and the distance between the data line and the second target common electrode ranges from 0.5 µm to 1.5 µm.

6. The array substrate according to claim 1, further comprising: a plurality of gate lines and a gate insulating layer; wherein
   the plurality of gate lines are disposed on a side of the base substrate, and an extension direction of each of the gate lines is intersected with an extension direction of any of the data lines; and
   the gate insulating layer is disposed on a side, distal from the base substrate, of the plurality of gate lines.

7. The array substrate according to claim 1, further comprising: a passivation layer;
   wherein the passivation layer is disposed on a side, distal from the base substrate, of the plurality of common electrodes.

8. A method for manufacturing an array substrate, comprising:
   providing a base substrate; and
   forming a plurality of common electrodes, a plurality of data lines, and a plurality of pixel electrodes arranged in an array, on a side of the array substrate;
   wherein
   an orthographic projection of each of the data lines on the base substrate is not overlapped with an orthographic projection of any of the common electrodes on the base substrate; and with respect to each of the data lines, a distance between the data line and a first target common electrode is different from a distance between the data line and a second target common electrode, the first target common electrode and the second target common electrode being respectively disposed on two sides of the data line; and
   an orthographic projection of each of the pixel electrodes on the base substrate is not overlapped with an orthographic projection of any of the data lines on the base substrate, wherein each column of the pixel electrodes is connected to one of the data lines; and with respect to each of the data lines, a distance between the data line and a first target pixel electrode is equal to a distance between the data line and a second target pixel electrode, the first target pixel electrode and the second target pixel electrode being respectively disposed on the two sides of the data line; and wherein with respect to each of the data lines, the distance between the data line and the first target common electrode is greater than the distance between the data line and the second target common electrode, and an orthographic projection of the pixel electrode connected to the data line on the base substrate at least partially is overlapped with an orthographic projection of the first target common electrode on the base substrate; and a distance between the second target common electrode and the second target pixel electrode is larger than a distance between the first target common electrode and the first target pixel electrode.

9. The method according to claim 8, wherein both a distance between the data line and the first target pixel electrode and a distance between the data line and the second target pixel electrode range from 4.5 µm to 6 µm.

10. The method according to claim 8, wherein a distance between the data line and the first target pixel electrode is smaller than a distance between the data line and the second target pixel electrode.

11. The method according to claim 8, wherein forming the plurality of common electrodes on the side of the base substrate comprises:
forming the plurality of common electrodes on the side of the base substrate by using a first mask, wherein a position where the first mask is disposed is offset by a target distance relative to a first initial position in a direction perpendicular to the data lines.

12. The method according to claim 8, wherein forming the plurality of data lines on the side of the base substrate comprises:
forming the plurality of data lines on the side of the base substrate by using a second mask, wherein a position where the second mask is disposed is offset by a target distance relative to a second initial position in a direction perpendicular to the data lines.

13. The method according to claim 8, wherein forming the plurality of common electrodes and the plurality of the data lines on the side of the base substrate comprises:
forming the plurality of common electrodes on the side of the base substrate; and
forming the plurality of data lines on the side, distal from the base substrate, of the plurality of common electrodes.

14. The method according to claim 13, wherein
prior to forming the plurality of common electrodes on the side of the base substrate, the method further comprises:
forming a plurality of gate lines on a side of the base substrate; and
forming a gate insulating layer on a side, distal from the base substrate, of the plurality of gate lines; and
upon the forming the plurality of data lines on the side, distal from the base substrate, of the plurality of common electrodes, the method further comprises:
forming a passivation layer on a side, distal from the base substrate, of the plurality of data lines.

15. The method according to claim 13, wherein upon forming the plurality of data lines on the side, distal from the base substrate, of the plurality of common electrodes, the method further comprises:
forming the plurality of pixel electrodes arranged in an array on the side, distal from the base substrate, of the plurality of data lines;
wherein the orthographic projection of each of the pixel electrodes on the base substrate is not overlapped with the orthographic projection of any of the data lines on the base substrate, and each column of the pixel electrodes is connected to one of the data lines.

16. The method according to claim 15, wherein
prior to forming the plurality of common electrodes on the side of the base substrate, the method further comprises:
forming a plurality of gate lines on a side of the base substrate; and
forming a gate insulating layer on a side, distal from the base substrate, of the plurality of gate lines; and
upon the forming the plurality of data lines on the side, distal from the base substrate, of the plurality of common electrodes, the method further comprises:
forming a passivation layer on a side, distal from the base substrate, of the plurality of data lines.

17. A display device, comprising a driving circuit and an array substrate, wherein
the array substrate comprises:
a base substrate;
a plurality of common electrodes disposed on a side of the base substrate;
a plurality of data lines disposed on a side of the base substrate, wherein an orthographic projection of each of the data lines on the base substrate is not overlapped with an orthographic projection of any of the common electrodes on the base substrate; and with respect to each of the data lines, a distance between the data line and a first target common electrode is different from a distance between the data line and a second target common electrode, the first target common electrode being the second target common electrode are respectively disposed on two sides of the data line; and
a plurality of pixel electrodes arranged in an array and disposed on a side of the base substrate, wherein an orthographic projection of each of the pixel electrodes on the base substrate is not overlapped with the orthographic projection of any of the data lines on the base substrate, and each column of the pixel electrodes is connected to one of the data lines;
and with respect to each of the data lines, a distance between the data line and a first target pixel electrode is equal to a distance between the data line and a second target pixel electrode, the first target pixel electrode and the second target pixel electrode being respectively disposed on the two sides of the data line, and
the driving circuit is connected to the plurality of data lines in the array substrate, and is configured to supply a data signal to each of the data lines; and
wherein with respect to each of the data lines, the distance between the data line and the first target common electrode is greater than the distance between the data line and the second target common electrode, and an orthographic projection of the pixel electrode connected to the data line on the base substrate at least partially is overlapped with an orthographic projection of the first target common electrode on the base substrate; and
a distance between the second target common electrode and the second target pixel electrode is larger than a distance between the first target common electrode and the first target pixel electrode.

18. The display device according to claim 17, further comprising: a black matrix layer; wherein
a distance between the black matrix layer and the first target common electrode in the array substrate is equal to a sum of a distance between the black matrix layer and the first target pixel electrode in the array substrate and a distance between the first common electrode and the first target pixel electrode; and a distance between the black matrix layer and the second target common electrode in the array substrate is equal to a sum of a distance between the black matrix layer and the second target pixel electrode in the array substrate and a distance between the second common electrode and the second target pixel electrode.

19. The display device according to claim 18, wherein the distance between the black matrix layer and the first target common electrode is less than the distance between the black matrix layer and the second target pixel electrode; or the distance between the black matrix layer and the first target common electrode is equal to the distance between the black matrix layer and the second target common electrode.

\* \* \* \* \*